US006685147B1

United States Patent
Ma

(10) Patent No.: US 6,685,147 B1
(45) Date of Patent: Feb. 3, 2004

(54) NAIL POLISH BOTTLE HOLDER

(76) Inventor: Yan Ling Ma, 216 Franklin Ave., River Forest, IL (US) 60305

( * ) Notice: Subject to any disclaimer, the term of this patent is extended or adjusted under 35 U.S.C. 154(b) by 0 days.

(21) Appl. No.: 10/263,038

(22) Filed: Oct. 2, 2002

Related U.S. Application Data

(63) Continuation-in-part of application No. 10/037,166, filed on Dec. 31, 2001, now abandoned.

(51) Int. Cl.[7] ................................................. A47F 7/28
(52) U.S. Cl. ........................ 248/139; 248/127; 248/133; 248/105
(58) Field of Search ............................... 248/139, 128, 248/133, 104, 130, 131, 398, 371, 313, 316.1

(56) References Cited

U.S. PATENT DOCUMENTS

| | | | | |
|---|---|---|---|---|
| 442,585 A | * | 12/1890 | Huppmann-Valbella | |
| 711,339 A | | 10/1902 | Park | |
| 2,040,757 A | * | 5/1936 | Murphy | 248/103 |
| 2,386,042 A | * | 10/1945 | Elzeer | 248/106 |
| 2,469,859 A | * | 5/1949 | Charbeneau | 248/105 |
| 2,558,978 A | * | 7/1951 | Pettit | 248/105 |
| 2,748,952 A | | 6/1956 | Fleit et al. | 211/74 |
| 3,090,590 A | | 5/1963 | Hester | 248/346 |
| 3,220,685 A | | 11/1965 | Himler | 248/350 |
| 3,964,709 A | | 6/1976 | LaBelle et al. | 248/133 |
| 4,093,165 A | * | 6/1978 | Sussman | 248/106 |
| 4,317,551 A | | 3/1982 | Bishop | 248/141 |
| 4,321,935 A | * | 3/1982 | Sussman | 132/73 |
| 4,627,546 A | * | 12/1986 | Carranza | 215/100 A |
| 4,795,117 A | | 1/1989 | Siteman | 248/146 |
| 5,094,415 A | * | 3/1992 | Revette et al. | 248/133 |
| 5,141,188 A | | 8/1992 | DeBlasi et al. | 248/142 |
| D346,221 S | * | 4/1994 | Godfrey | D24/199 |
| 5,425,460 A | * | 6/1995 | Barbarian | 211/77 |
| 5,636,815 A | * | 6/1997 | Wilson | 248/125.9 |
| 5,772,163 A | | 6/1998 | Young | 248/139 |

* cited by examiner

Primary Examiner—Leslie A. Braun
Assistant Examiner—Steven Marsh
(74) Attorney, Agent, or Firm—Philip H. Kier

(57) ABSTRACT

A holder for a nail polish bottle that allows the bottle to be tipped at any angle wanted by the user and that allows viewing of an applicator extracting polish from the bottle. It has a fixed post attached to a base that stabilizes the holder against unwanted motion during use. There is a pivoting post also. The top of the fixed post and the bottom of the pivoting post form a ball and socket joint that allows the pivoting post to tilt at any angle wanted by a user. The pivoting post is attached to a spring-loaded clip. The clip contains arms with non-slip inner surfaces. The arms have an arcuate hollow elliptical oval shape that allows the user to view the transferring of polish to the applicator so that a proper amount is transferred. The clip is opened by pressing its lever portions together to stress the spring. When the pressure on the lever portions ceases, the arcuate arms close to hold the bottle securely.

3 Claims, 3 Drawing Sheets

NAIL POLISH BOTTLE HOLDER

CROSS REFERENCE TO RELATED APPLICATIONS

This application is a Continuation-in-Part of abandoned application Ser. No. 10/037,166 filed on Dec. 31, 2001.

The field of the present invention relates to an improved nail polish bottle holder that can hold nail polish bottles of various sizes and shapes at any dispensing angle desired and does not obscure the view of the bottles contents. It is useful for dispensing nail polish in the nail polishing process.

BACKGROUND OF THE INVENTION

Nail polish is a fast drying lacquer that is ordinarily applied to the nails from a small bottle using a brush applicator affixed to the closure cap of the bottle. Because of the fast drying nature the user is often in a hurry. Further, the user is confronted with the problem of drawing a small quantity of the lacquer repeatedly. The bottle size is an annoying factor further complicated by the users need to secure bottle with one hand, as the applicator is dipped to draw the desired fill of polish. The bottle is then set aside as the applicator applies its fill of polish to a fingernail. These steps are repeated until all the nails are polished.

It is obvious that this process is tedious, awkward, and frustrating, frequently resulting in unsatisfactory results from spills of the nail polish and smudges in the newly painted nail that occur as a result of the constant manipulation of the nail polish bottle. Applying the nail polish without having to hold the bottle is therefore desirable.

It is a well-known phenomenon that when a brush is placed in a bottle of nail polish when the bottle is upright it is very difficult to extract the necessary amount of liquid from the bottle if the bottle is less then half full. However, if the bottle is tipped, it is much easier to extract the liquid. As the contents of the bottle reduce, the bottle must be tipped at slightly greater angles. A nail polish bottle holder that could hold the nail polish bottle at varying angles is therefore necessary.

Apparatus for holding the bottle at a desired angle allows the user more mobility to apply the polish resulting in a much better result. Since it is necessary to judge the depth of the inserted applicator in the nail polish bottle to avoid making a mess and drawing the required fill, it is desirable for the user to be able to see the contents of the bottle. Nail polish comes in bottles of various size and shape and therefore it is desirable to have a holder that can hold nail polish bottles of various size and shape.

These problems have drawn interest and patents have been granted on several inventions that address some of the problems of holding the bottle in a tipped position. However these inventions need further improvement. They tend to be limited to bottles of certain sizes or shapes or only allow the bottle to be tipped at certain angles. They may also call for the bottle to be held in an opaque frame that obscures sight of the liquid in the bottle, which makes it difficult to use an applicator properly. For example, LaBelle et al in U.S. Pat. No. 3,964,709 teach the use of a frame that keeps a bottle at generally 45° from an upright position. DeBlasi et al in U.S. Pat. No. 5,141,188 teaches us the need to selectively tip the container of nail polish, however the invention is limited because the receptacle is lined with plastic foam and this will obscure the user's view of the bottle interfering with the user's ability to draw the desired amount of polish with the applicator. The device also is dependent on the use of detents to tip the bottle requiring more force that could result in smudges to the users newly painted nail. De Blasi also limits the size and shape of bottles that can be held, as does Siteman in U.S. Pat. No. 4,795,117, which is dependent on a sand bag of sufficient mass to restrain the bottle. Also, improper touch will upset the bottles tilt causing unsatisfactory results. The bottle support taught by Fleit, et al in U.S. Pat. No. 2,748,952 also limits the size of bottles. The present invention addresses the need for a nail polish bottle holder that does not obscure the view of the bottles contents and does away with the inability of prior art to hold nail polish bottles of varying size and shape at the desired angle.

SUMMARY OF THE INVENTION

The principal object of the present invention is to improve upon the prior art by providing a nail polish bottle holder that does not obscure the view of the bottles contents while holding bottles of various sizes and shapes at the angles desired to easily draw the nail polish from the bottle regardless of the amount of liquid remaining in the bottle. It is also the principal object of the present invention to eliminate difficulties in retrieving the nail polish from the bottle by eliminating the users need to hold the bottle while drawing the contents.

The present invention has four essential elements: a base, a fixed post; a pivoting post; and a clip. The fixed post has a bottom that is integrally attached to the base and has a top that forms a socket for a ball and socket joint. The clip is spring-loaded such that pressure must be applied to lever portions to open the arms of the clip, which have the shape of an arcuate hollow ellipse. If pressure is applied to the lever portions to open the arms, a nail polish bottle placed interior to the open arms, and then the pressure on the lever portions is released, the arcuate arms will press against the bottle and hold it securely. As the center of each arm is hollow the user can observe whether the brush applicator is extracting enough polish from the bottle, and therefore how much the bottle should be tilted. The pivoting post has a bottom section that is spherical in shape and that can be snapped into the socket in the fixed post to form a ball and socket joint. The rest of the pivoting post is generally cylindrical in shape with a lower section and an upper section. The upper section has a cross section that is smaller than the lower section except for lips at the top of the pivoting post. Also, there is a slit in the upper section. The clip is attached to the pivoting post by pushing the pivoting post up through the center of the clip's flange and spring. The slit in the upper section is compressed to allow the top of the pivoting post to pass through the interior of the spring and the clip's flange. After the slit has passed through the clip's flange and spring, the clip is held securely on the pivoting post between the lips and the lower section. This operation and snapping the ball of the pivoting post into the socket of the fixed post, essentially assemble the bottle holder. A bottle held securely in the clip is tilted by tilting the pivoting post.

Another object of the present invention is to provide a device, which is of simple and inexpensive construction that can be easily assembled. Still another object of the present invention is to provide a nail polish bottle holder that allows easy insertion of nail polish bottles of various shapes and sizes. It is another object of the present invention is to provide a device that will eliminate unsatisfactory results. Another object of the present invention is to provide a device that allows the bottle to rotate on 360 degree around a center post and to tip 90 degrees from its vertical position. It is another object of the present invention to provide a device that is not archaic in appearance.

The foregoing objects and advantages of this invention are accomplished by following the detailed specifications of the preferred embodiment with reference to the accompanying drawings.

DETAILED DESCRIPTION OF THE INVENTION

Figure 3:
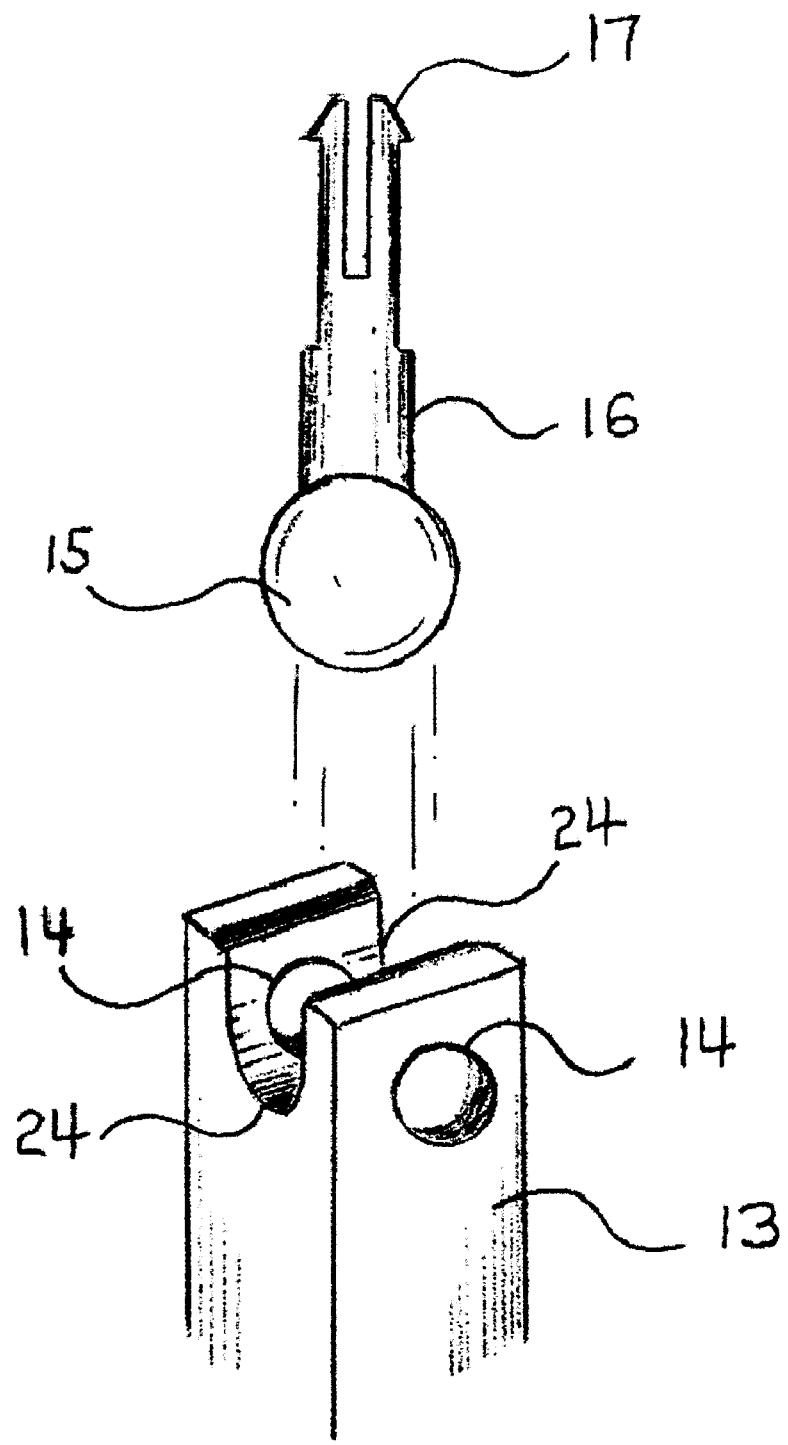
FIG. 3 is a fragmentary side view of the pivoting joint formed by the fixed post and the pivoting post.

As shown in the accompanying drawings, the preferred embodiment of the nail polish bottle holder in accordance with the present invention includes the following components. There is a base 10 that sits on a flat, horizontal surface such as a table. The base, which could be circular, provides stability to the holder. Attached to the base is a fixed post 13 that is integrally attached to the base and may be molded together with the base during manufacture as one piece. The top of the fixed post 13 has a U-shaped channel that forms a socket 24 (see FIG. 3.) and has circular holes 14 which are lateral and adjacent to the channel. Another element of the bottle holder, as shown in FIG. 3, is a pivoting post 15 comprising of a vertical post 16 integrally attached to a bottom spherical member having a diameter slightly larger than the distance between the walls of U-shaped socket 24. When the bottle holder is assembled, the spherical bottom of the pivoting post 15 is forced into the space between the walls of the socket forcing them to open slightly and to allow the spherical bottom to be seated in the circular holes 14. The point of tangency between the spherical bottom of post 15 and holes 14 hold the pivot post in place within the socket channel 24. The pivot post can then pivot or tilt in a direction parallel to the walls of the U-shaped socket up to 90° from vertical.

The diameter of the vertical member of pivot post 15 is stepped so that the upper cross section has a smaller cross sectional area than the lower section except at the top where there are lips 17. The upper section also has vertical slot creating a void that allows the upper section to be compressed for assembly of the clip 21 and spring 18 of the embodiment. The embodiment has a clip 21 that is attached to the upper section of vertical post 16 that is used to hold a nail polish bottle in either an upright or tilted position. More particularly, the bottle is held in the arms of the clip. The clip 21 is attached to the vertical post 16 by moving it through flange 19 of the clip. A torsion spring 18 is inserted coaxially between flanges 19. The cross section of the center of the spring 18 is larger then the cross section of the upper section of pivot post 16 but smaller than the uncompressed lips 17. Therefore, for the lips to pass through the interior of the spring and the flange, the upper section of the vertical post 16 and the lips are compressed (narrowed). Once the lips have passed through the spring and flanges of the clip, the top of the slit decompresses (widens) and the clip's flange 19 can no longer pass through lips causing the clip to remain in its fixed axial position between the lips and the step in the lower section of vertical post. The clip is able to rotate freely 360 degrees. The length of the upper section of vertical post 16 is such that the spring and flanges will sit on the top of the lower section when the lips 17 of the upper section have passed through the clip's flanges and spring. In this way the pivoting post 16 holds clip 21 in place.

Figure 1:
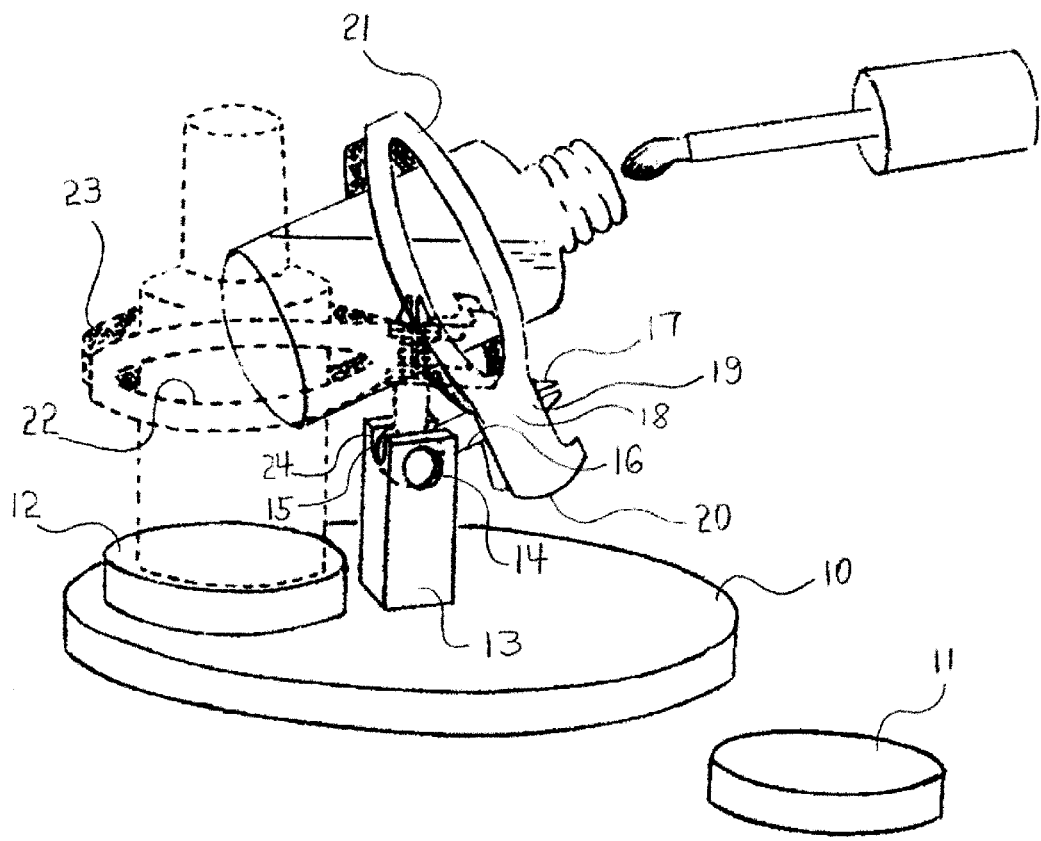
FIG. 1 is a perspective view of the holder showing the bottle in 2 positions.
Figure 2B:
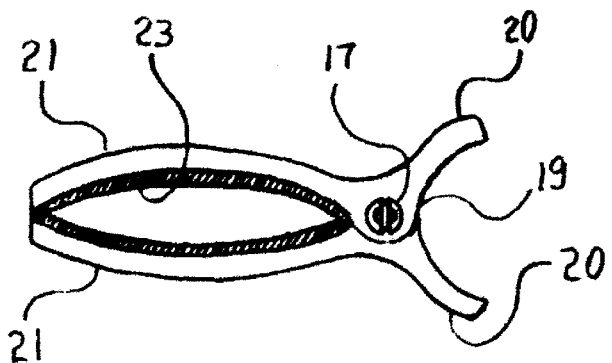
FIG. 2B is a fragmentary top view of the clip
Figure 2A:
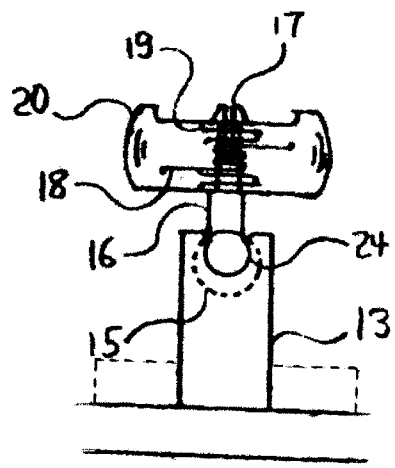
FIG. 2A is a fragmentary back view of the holder.
Figure 2:
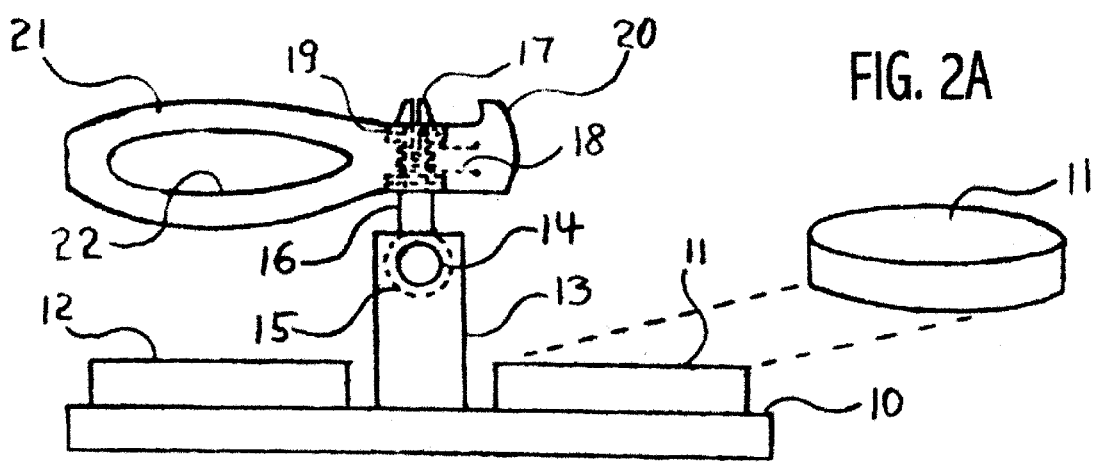
FIG. 2 is a vertical side view of the holder.

The clip has two like members. Each member has an arm 21, a lever portion 20, and two flanges 19, as shown in FIG. 2B. The flanges are located between the arm and the lever portion of a like member at opposite ends of the member and are perpendicular to the plane of the member. Each flange has a hole with a large enough diameter to accommodate the upper section of vertical member 16. Each arm may have a hollow elliptical shape 22 as shown from the side in FIG. 2, to facilitate viewing of a bottle held by the arms. To help prevent the bottle from slipping and to provide a stronger grip, there may be a friction-inducing cushion 23 on the inner surface of each arm as shown in FIG. 2B. This cushion may be rubber. Also, the arms may be bowed, arcuate, to hold a bottle more securely, shown in FIG. 2B. The clip is spring-loaded, where preferably the spring is a torsion spring. To open the clip to insert or remove a bottle, lever portions 20 are pressed together and force is applied to change the spring from its rest position. When the lever portions are released after the bottle has been removed, the spring returns to its rest position with the arms returning to their closed position, as shown in FIG. 2B.

A permanent stand 12 may be located on base 10 to give a bottle sufficient elevation so that the clip can grasp the bottle without the bottle having to be held by the user. If the permanent stand does not give the bottle enough elevation (nail polish bottles are marketed in a variety of sizes), a removable stand 11 could be placed on top of the permanent stand to provide more elevation.

I claim:

1. A nail polish bottle holder comprising:

a base;

A fixed post with a bottom and a top, wherein the bottom is integrally attached to the base and the top forms a socket for a ball and socket groove, the socket having a U-shaped groove with a circular hole in each wall of the U-shaped groove;

a pivoting post with a ball-shaped bottom forming a ball component for a ball and socket joint, with a lower section and with an upper section, the upper section having a smaller cross sectional area than the lower section except for lips at its top and the upper section having a longitudinal slit; and a clip deployed on the pivoting post, the clip having two like members, each like member having an arm with an arcuate, hollow elliptical shape, a lever portion, and two flanges, the arcuate arms being formed to define an elliptical space to receive a bottle, a wherein spring is inserted between the flanges in the members of the clip, the spring being stressed when the lever portions of the like members are pressed together.

2. A bottle holder as set forth in claim 1 wherein inner surfaces of the arms of the clip are friction-inducing cushions.

3. A bottle holder as set forth in claim 2 further comprising a permanent stand on the base.

* * * * *